No. 630,136. Patented Aug. 1, 1899.
A. TRAVAGLINI.
GAS OPERATED FIREARM.
(Application filed Feb. 8, 1898.)
(No Model.) 4 Sheets—Sheet 1.
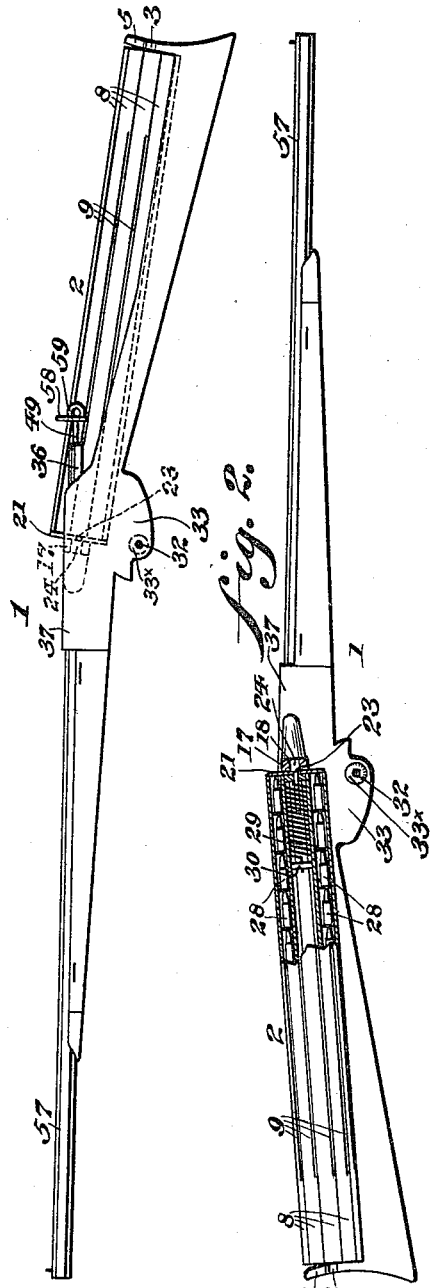
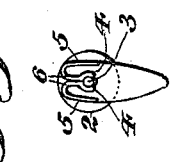
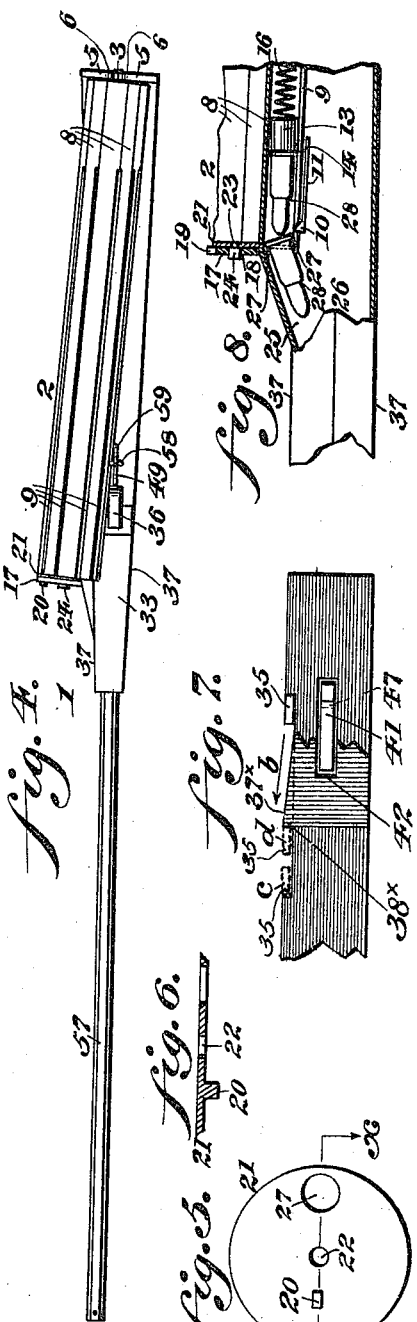
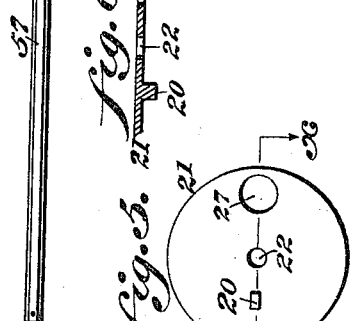
WITNESSES:
L. Douville
P. F. Eagle
INVENTOR
Antonio Travaglini,
BY
Wiedersheim & Fairbanks
ATTORNEYS.

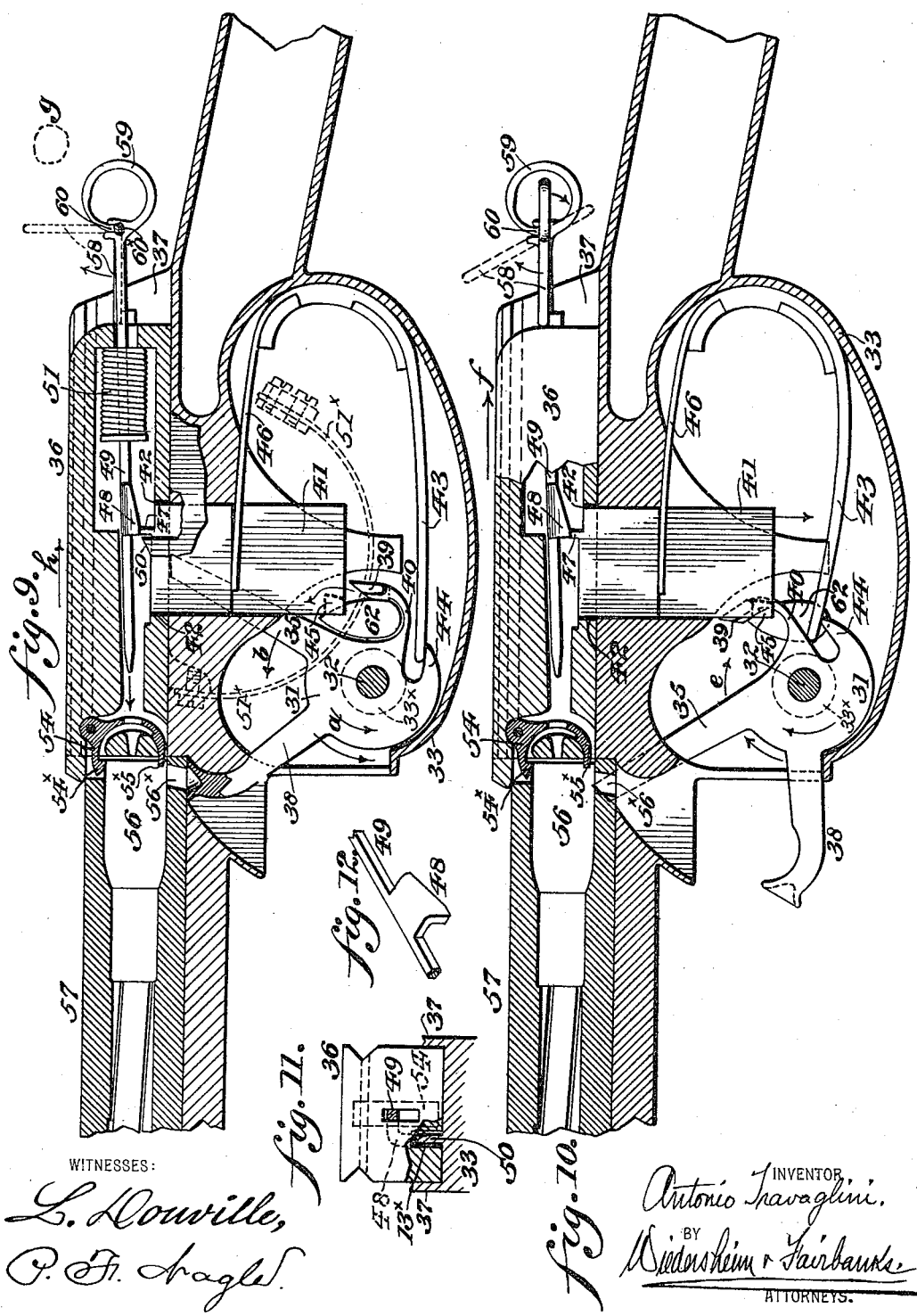

No. 630,136. Patented Aug. 1, 1899.
A. TRAVAGLINI.
GAS OPERATED FIREARM.
(Application filed Feb. 8, 1898.)
(No Model.) 4 Sheets—Sheet 3.
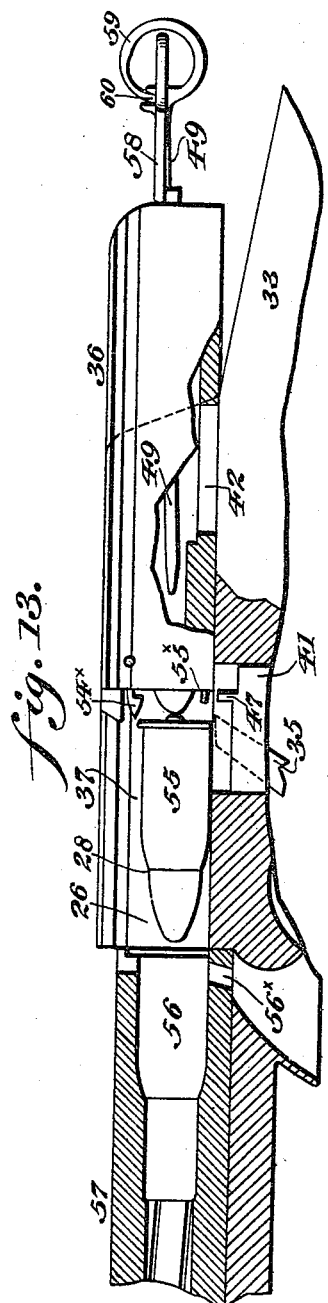
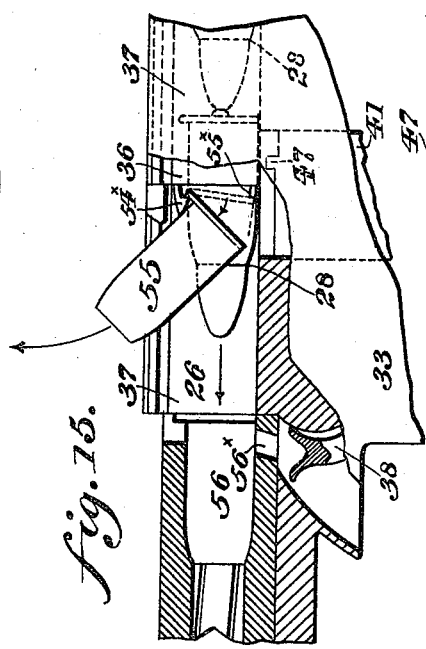
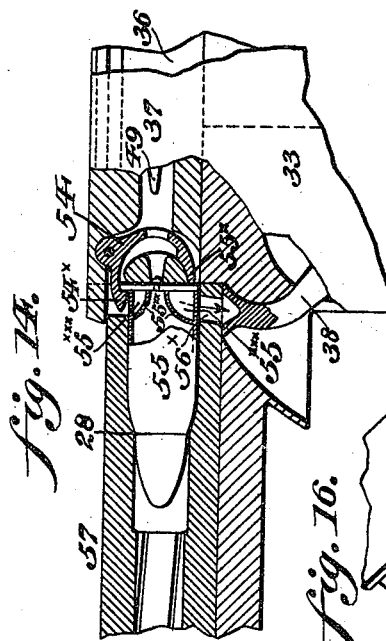
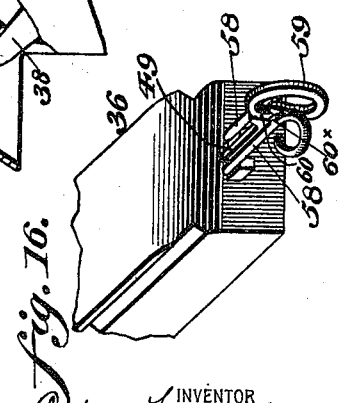
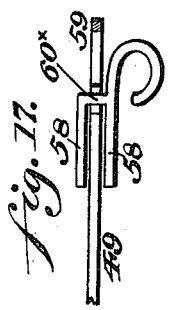
WITNESSES:
L. Douville,
P. F. Sragles.
INVENTOR
Antonio Travaglini.
BY
Wiedersheim & Fairbanks.
ATTORNEYS.

No. 630,136. Patented Aug. 1, 1899.
A. TRAVAGLINI.
GAS OPERATED FIREARM.
(Application filed Feb. 8, 1898.)
(No Model.) 4 Sheets—Sheet 4.
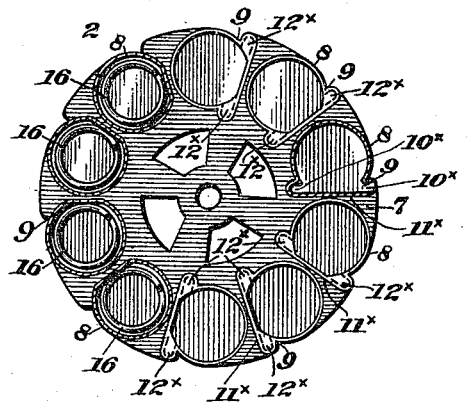
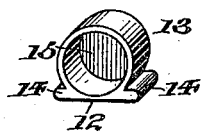
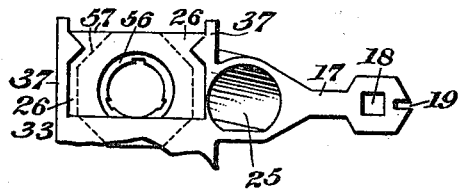
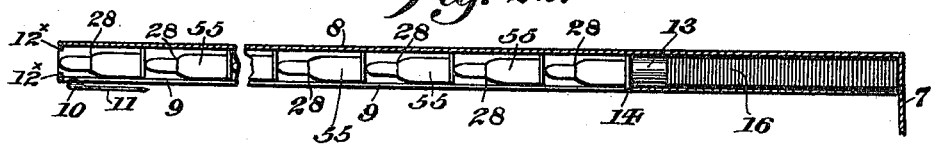
WITNESSES:
L. Douville,
P. F. Dagle.
INVENTOR
Antonio Travaglini
BY
Wiedersheim & Fairbanks,
ATTORNEYS.
THE NORRIS PETERS CO., PHOTO-LITHO., WASHINGTON, D. C.

UNITED STATES PATENT OFFICE.

ANTONIO TRAVAGLINI, OF PHILADELPHIA, PENNSYLVANIA, ASSIGNOR OF ONE-HALF TO CAMILLO D. BENEDICTIS, OF SAME PLACE.

GAS-OPERATED FIREARM.

SPECIFICATION forming part of Letters Patent No. 630,136, dated August 1, 1899.

Application filed February 8, 1898. Serial No. 669,503. (No model.)

*To all whom it may concern:*

Be it known that I, ANTONIO TRAVAGLINI, a citizen of the United States, residing in the city and county of Philadelphia, State of Pennsylvania, have invented a new and useful Improvement in Firearms, which improvement is fully set forth in the following specification and accompanying drawings.

My invention consists of an improved construction of firearm or magazine-gun; and it consists of a rotary magazine supplied with cartridges and journaled in the stock of said gun.

It also consists of means for automatically imparting a partial rotation to the magazine at intervals, so as to remove a tube in the magazine from alinement with the passage that forms a communication between said tube and the cartridge-chamber when the tube has been emptied of its cartridges, the partial rotation imparted to said magazine bringing a subsequent tube, filled with cartridges, in alinement with the passage that forms a communication between the magazine and cartridge-chamber, so that the cartridges in the tube may be fed to the cartridge-chamber at proper intervals.

It also consists of means for firing only a portion of the cartridges contained in the magazine and also of means for firing but a single shot, when so desired, the mechanism being so devised that any required length of time may elapse between successive shots.

It also consists of means for extracting a cartridge-shell from the gun-barrel after the projectile has been fired, so as to make room for a subsequent cartridge.

It further consists of novel details of construction, all as will be hereinafter fully set forth, and particularly pointed out in the claims.

Figure 1 represents a side elevation of a magazine-gun embodying my invention. Fig. 2 represents a side elevation of the gun seen in Fig. 1, showing a portion of the magazine thereof in section. Fig. 3 represents an end view of Fig. 2, showing the manner of supporting one extremity of the magazine. Fig. 4 represents a plan view of Fig. 1. Fig. 5 represents, on an enlarged scale, a plan view of a disk or plate employed for closing one end of the magazine. Fig. 6 represents a section on line $x\ x$, Fig. 5. Fig. 7 represents a plan view of a portion of the gun and a sliding breech-block thereon. Fig. 8 represents a plan view, partly in section, showing the manner in which the cartridges are discharged from the magazine. Figs. 9 and 10 represent sectional views, partly in elevation, showing certain portions of the operating mechanism. Fig. 11 represents an end elevation, partly in section, of certain detached portions of the gun. Fig. 12 represents a perspective view of a portion of the firing-pin. Figs. 13, 14, and 15 represent side elevations, partly in section, of portions of the gun. Fig. 16 represents a perspective view of certain detached portions of the gun to be hereinafter referred to. Fig. 17 represents a perspective view of a portion of the firing-pin and fingers carried by the same. Fig. 18 represents a side elevation of a bolt employed. Fig. 19 represents an end view, partly in section, of the magazine and its adjuncts. Fig. 20 represents a perspective view of a follower employed. Fig. 21 represents an elevation of a portion of the magazine-support. Fig. 22 represents a sectional view through a chamber of the magazine.

Similar letters and numerals of reference indicate corresponding parts in the figures.

Referring to the drawings, 1 designates a firearm, the same being provided with the magazine 2, which is provided with the rear gudgeon or journal 3, which is held in the bearings 4, said bearings being formed by means of the springs 5, which have the downwardly-turned members 6, which terminate in the bearing for said gudgeon. The magazine is composed of a back plate 7, to which are attached the tubes or chambers 8, which may be of any desired number, the junction of each two of said tubes forming longitudinally-extending external grooves 9, which latter are adapted to be engaged by the nose 10, mounted on the free end of the spring 11, which is adapted to be secured to any suitable support in the gun-lock. The general contour of the chamber 8 will be understood from Fig. 19, the body of each chamber or tube being substantially cylindrical, but provided with the recesses $10^\times$ adjacent the first side 11×, against which latter is adapted to abut the wall 12 of the follower 13, which latter has the guides 14, which travel in said recesses or ways 10×. The follower 13 is provided with the cup-shaped recess 15, which is adapted to receive one end of the spring 16, while the other end of said spring bears against the back wall 7 of each tube 8. In the groove 9 in the wall of each tube 8 travels one of the guides 14, so that the latter may at the proper interval be engaged by the nose 10 and disengage the same from said groove, thereby permitting the magazine 2 to rotate until the next groove 9 can be engaged by said nose 10, as will be hereinafter explained.

17 designates a plate projecting from a suitable portion of the stock of the gun, said plate having a square or similar-shaped opening 18 therein, adjacent to which is a recess 19, which latter is adapted to be engaged by the lug 20 of the plate 21, said plate having an opening 22 therein which is adapted to rotate upon the axis 23 of the pin or plug 24, which latter is inserted in the opening 18, as will be understood from Figs. 2 and 8.

25 designates an opening or throat leading into the cartridge-chamber 26 of the gun, it being understood that the opening 27 in the plate 21 is always in alinement with some one of the magazine-tubes 8, as will be understood from Fig. 8, so that the cartridges 28 will always be permitted to be discharged at the proper intervals through the throat or passage 25 into said cartridge-chamber.

The desired rotation of the magazine-tube is effected by means of the torsional spring 29, which has one end attached to the plate 30, contained within said magazine, as will be understood from Fig. 2, while the other end of said spring is secured to a suitable portion of the pin or plug 24, so that the tendency will always be after the magazine has been given a few turns for said magazine to rotate to the desired extent at the proper interval, as will be explained.

31 designates a hub firmly secured to a shaft 32, journaled in the casing 33 of the gun-lock. 35 designates an arm which projects from said hub 31 and is adapted to operate a sliding breech-block 36, guided in the side walls 37 of the cartridge-chamber 26, as will be hereinafter described.

38 designates an arm which projects from the hub 31, so as to be operated by a portion of the force or energy exerted by the explosion resulting from the firing of a cartridge 28, as will be hereinafter described.

39 designates a lug on one extremity of a spring 40, which projects from the hub 31, the object of said lug and spring being to remove a locking-bolt 41 from a slot 42 in the sliding breech-block 36, so as to permit said block to be moved by the arm 35 at the proper time, for a purpose to be hereinafter described.

The arms 35 and 38 and the spring 40 are retained in their normal positions by a spring 43, as seen in Fig. 9, it being noted that one end of the spring 43 is in contact with the member 44 of the hub 31.

The locking-bolt 41 is provided with a lug 45, with which engages the lug 39 when the arms 35 and 38 are in the positions seen in Fig. 10, for a purpose to be hereinafter described. The locking-bolt 41 is retained in its normal position by a spring 46, as seen in Figs. 9 and 10, and is provided with a projection 47, which contacts with a nose 48 on the trigger 49, so as to lift said nose away from a stop 50, so that said trigger 40 may be carried forward by a spring 51, so as to fire a cartridge when so desired, it being noted that the stop 50 rises from casing 33 of the gun-lock.

The sliding breech-block 36 is returned to its normal position after having been moved by the arm 35 by a spring 51×. (Seen in Fig. 9.) The sliding breech-block 36 carries an extractor 54, which removes a shell 55 from the portion 56 of the gun-barrel 57 and ejects said shell, so as to make room for a subsequent cartridge, as will be hereinafter described.

The firing-pin 49 has pivoted thereto the fingers 58, (see Figs. 9, 10, 13, 16, and 17,) the points or extremities of said fingers 58 normally abutting against one end of the sliding breech-block 36, so as to prevent the spring 51 from operating the firing-pin 49 when no firing of a cartridge is desired. The eye portion 59 of the firing-pin 49 answers as a spring to retain the fingers 58 in their adjusted positions, as best seen in Fig. 9, it being noted that the end 60 of the eye 59 bears against the journal 60× of the fingers 58, and thereby prevents improper movement of said fingers 58 due to the jarring occasioned by the firing of the gun.

By "adjusted positions" of the fingers 56 is meant their occupying either a horizontal or a vertical position.

The casing of the gun-lock is provided with a stationary cam 62, against which works the free end of the spring 40, so that the lug 39 will be removed from contact with the lug 45 at the proper time by said cam 62, so as to permit the locking-bolt 41 to be lifted in order to enter the opening or slot 36 and retain said breech-block firmly in position when a cartridge is fired.

The operation is as follows: The cartridges 28 are passed through the opening 27 in the plate 21 and follow each other one by one, and when one tube 8 is filled the plate 21 is partially rotated, so as to bring the opening 27 therein in alinement with another tube 8, which may likewise be filled with cartridges, and so on with the remainder of the tubes 8 in the magazine, it being apparent that the cartridges 28 cannot escape from the magazine 2 except through the opening 27 in the plate 21. In practice as a rule the charging of the magazine 2 with cartridges 28 is not done by the person using the gun, but the magazines are furnished already charged and ready for use. The magazine 2 is placed in position in the stock of the gun, as hereinbefore described, and the several parts of the mechanism within the casing 33 of the gun-lock are in the positions seen in Fig. 9. When it is desired to fire a single shot, the button $33^\times$, which is made of sufficient diameter to be firmly and readily grasped and is mounted on the shaft 32, is rotated in the direction indicated by the arrow $a$ in Fig. 9 and causes the arm 35 to travel in the direction indicated by the arrows $b$ in Figs. 7 and 9, and when said arm has traveled to its full extent it will be in the position shown in Fig. 10, it being noted that when said arm is moving backward from its position at $c$ in Fig. 7 to the position indicated at $d$ said arm produces no effect on the sliding breech-block 36 and the distance from $c$ to $d$ is lost motion for the arm 35, since it only comes in contact with the sliding breech-block 36 when it is in the position indicated at $d$ in Fig. 7. When the arm 35 occupies the position indicated at $c$ in Fig. 7, the lug 30 has been brought in contact with the lug 45 on the locking-bolt 41. (See Fig. 10.) Consequently when the arm 35 is traveling from $c$ to $d$ in Fig. 7 and producing no effect on the sliding block 36 the bolt 41 is being removed from the slot 42 in the sliding breech-block 36, so that by the time the arm 35 has reached the position indicated at $d$ the locking-bolt 41 will have been withdrawn from the slot 42, and the breech-block 36 will then offer no perceptible resistance to the arm 35, so that said arm 35 in returning to its normal position, or in the direction indicated by the arrow $e$ in Fig. 10, will cause the sliding breech-block 36 to move in the direction indicated by the arrow $f$ in said Fig. 10, so that when the breech-block 36 has been moved to its full extent a space will be produced in the cartridge-chamber 26 between the forward end of the sliding breech-block 36 and the portion 56 of the barrel 57 of the gun, and into this space is fed a cartridge 28 from the magazine 2 by the action of the spring 16. When the arm 35 has returned to its normal position, as seen in Fig. 9, it is no longer in contact with the sliding breech-block 36. Consequently said breech-block will be moved by the action of the spring $51^\times$ toward the portion 56 of the gun-barrel, and in doing so will cause a cartridge 28 in its path to be forced forward by and enter said portion 56 of the gun-barrel, as seen in Fig. 14. The sliding breech-block 36 is formed with an inclined face $37^\times$, (see Fig. 7,) which terminates in a shoulder $38^\times$, so that when the arm 35 is being moved in the direction indicated by the arrows $b$ in Figs. 7 and 9 said arm will be deflected laterally by the inclined face $37^\times$; but as soon as said arm 35 has passed the shoulder $38^\times$ it springs back into its original plane and comes in the path of said shoulder, so as to engage the same, and consequently move the breech-block 36 backward, so as to produce the space for a cartridge 28, as hereinbefore described. In order to fire a single shot, it is only necessary to rock the fingers 58 so that the same will occupy a vertical position, so as to remove their points from contact with the rear wall of the sliding breech-block 36, and when the resistance offered by said fingers 58 to the spring 51 no longer exists said spring becomes operative and in expanding causes the firing-pin 49 to move rapidly forward and strike the cap of a cartridge 28 and fire the same. A portion of the force caused by the explosion of the cartridge will find its way through the port $56^\times$ at the breech end of the barrel of the gun and will be sufficient to rock the arm 38 from its normal position, as seen in Fig. 9, to that seen in Fig. 10, it being noted that the port $56^\times$ leads directly to the extremity of the arm 38, where the maximum leverage is attained. It will of course be apparent that while the major portion of the gases of explosion escape through the port $56^\times$ and exert their force on the arm 38 other ports may be provided, if desired, for the escape of said gases of explosion, it being, however, noted that by the employment of the special construction of cartridge seen in Fig. 14 substantially all the gases of explosion will escape through said port $56^\times$, as is evident. This will cause the arm 35 to again engage the shoulder $38^\times$, as hereinbefore described, and will also cause the lug 39 to engage with the lug 45 on the locking-bolt 41, so as to remove the latter from the slot 42 in the sliding breech-block 36 just prior to the contacting of the arm 35 with the shoulder $38^\times$. When the arms 35 and 38 are returning to their normal positions, the lug 39 is lowering the locking-bolt 41, and said lug in moving downwardly is gradually removed from contact with the lug 45 by the action of the cam 62, so that when the lug 39 is no longer in contact with the lug 45 the locking-bolt 41 will again be lifted by the action of the spring 46 and caused to enter the slot 42 in the sliding breech-block 36, so as to retain the latter in a fixed position prior to firing another shot. By placing a finger of the hand horizontally, as indicated by dotted lines at $g$ in Fig. 9, it will be apparent that when the sliding breech-block 36 is moving in the direction indicated by the arrow $h$ in Fig. 9 the fingers 58 will come in contact with the finger of the hand and will be rocked by the same and caused to drop from a vertical to a horizontal position, and consequently cause the points of the fingers 58 to bear against the rear wall of the sliding breech-block 36, and thereby hold the firing-pin 49 in the position seen in Fig. 9 and prevent the same from striking the cap of a cartridge 28. When a consecutive number of shots are to be fired, the operation is the same as that described in connection with the firing of a single shot, with the exception that the fingers 58 are permitted to remain in their upright position, as shown in dotted lines in Fig. 9, it being noted that when the locking-bolt 41 enters the slot 42 the projection 47 strikes the nose 48 and lifts the same and removes it from engagement with the stop 50, thereby permitting the spring 51 to expand and force the firing-pin forward, so that the latter may strike the cap of a cartridge 28 and fire the same. When a cartridge 28 is in position with the portion 56 of the gun-barrel, the shell-extractor 54 will be in the position seen in Fig. 14, and when said cartridge 28 has been fired the breech-block 36 is automatically moved in the direction indicated by the arrow $h$ in Fig. 9 by the action of the spring 43 and the arms 35 and 38, and the hook or claw $54^\times$ of the shell-extractor 54 draws the shell of the cartridge with it, and the toe portion $55^\times$ of the shell-extractor 54 flies rapidly forward and throws said shell 55 out of the cartridge-chamber 26, as seen in Fig. 15, so as to make room for a subsequent cartridge 28, forced into said chamber by the spring 16 from a tube 8 before the sliding breech-block 36 has time to be moved toward the portion 56 of the gun-barrel by the action of the spring 51. When the sliding breech-block 36 is moved in the direction of the arrow $h$ in Fig. 9 and to its full extent, the shell-extractor 54 reaches a point beyond the stop 50. Consequently said stop must be located a little to one side of the path of said shell-extractor 54, so as not to interfere therewith. Consequently the nose 48 of the firing-pin 49 must project to one side, so as to be in alinement with said stop 50. (See more particularly Figs. 11 and 12.) The shell-extractor 54 and the forward portion of the sliding breech-block 36 are each provided with an opening through which passes a portion of the firing-pin 49 when the latter is moved forwardly by the spring 51 in order to fire a cartridge 28. The followers 13 are prevented from being forced out of their respective tubes 8 by the lips $12^\times$ in the open ends of said tubes 8, (see Figs. 19 and 22,) it being noted that the guides 14 of the followers 13 abut against said lips $12^\times$ when the tubes 8 have been emptied of their contents. When all the cartridges 28 have been removed from a tube 8, one of the guides 14 of the follower 13 is brought in contact with the nose 10 of the spring 11 and lifts said nose out of the longitudinal groove 9, and the magazine 2 is partially rotated by the torsional spring 29, and as soon as a groove 9 in the next tube 8 is presented to the nose 10 the latter springs into the groove and retains the magazine 2 in locked position until the tube 8, which is in alinement with the throat 25, is emptied, when another partial rotation is imparted to the magazine 2, as hereinbefore described, and the same operation is repeated until the entire magazine is emptied of its contents, when the same may be removed and another magazine loaded with cartridges may be put in its place in the stock of the gun, as hereinbefore described.

It is to be noted that the stop 50 projects upwardly into the sliding breech-block 36. (See Fig. 11.) Consequently said breech-block 36 is provided with a longitudinal groove $13^\times$, in which said stop 50 plays.

The shell 55 of the cartridge 28 consists of two chambers $55^\times$ and $55^{\times\times\times}$, which are in communication with each other through the ports $55^{\times\times}$. (See Fig. 14.) When the firing-pin 49 strikes the cap of a cartridge 28, an explosion occurs in the chamber $55^\times$ in the shell 55 and causes the bullet of said cartridge to be fired from the gun, as is evident. A portion of the fire in the chamber $55^\times$, due to the explosion therein, will pass through the ports $55^{\times\times}$ and produce an explosion in the chamber $55^{\times\times\times}$ shortly after the explosion occurred in the chamber $55^\times$, so that a sufficient time will elapse between the two explosions in order to permit the bullet to be discharged from the shell 55 before the sliding breech-blocks 36 are moved in the direction indicated by the arrow $h$ in Fig. 9, for the purpose hereinbefore described.

It will be evident that changes may be made by those skilled in the art which will come within the scope of my invention, and I therefore reserve to myself the right to make all such changes as may come within the spirit thereof.

Having thus described my invention, what I claim as new, and desire to secure by Letters Patent, is—

1. A firearm having a sliding breech-block, a firing-pin carried thereby, a spring actuating said firing-pin, a stop limiting the movement of the latter, a hub carrying projecting arms, means for mechanically operating one of said arms, the other of said arms being operated by a portion of the force of the gases of explosion thereon, a spring for restoring said block to position and an ejector carried by said block.

2. In a firearm, a rotatable magazine, the same consisting of a plate, a plurality of tubes or chambers attached to said plate, said tubes having a flat side and recesses or extensions adjacent said side and serving as ways, cup-shaped followers adapted to travel in said tubes, said plungers having a flat side with projections adapted to traverse said recesses, a spring interposed between said plate and followers, and an apertured detachable plate adapted to be secured to the extremity of said magazine opposite said first-mentioned plate.

3. In a firearm, a magazine, means for imparting rotation to said magazine, a journal attached to the latter, said journal revolving in a bearing in downwardly-deflected springs, the lower extremities of said springs being cup-shaped so as to form said bearing, a detachable plate mounted on the other extremity of said magazine, said plate having a lug therein adapted to engage a stationary recess, a pin supporting said plate and a spring common to said magazine and pin for effecting the rotation of the former.

4. In a firearm, a hub rotatably mounted, arms 35 and 38 projecting therefrom, a restoring-spring 43 for said hub, a chamber 56 having an opening 56× with which said arm 38 is normally in alinement, a spring 40 attached to said hub, a locking-bolt 41 adapted to be actuated by said last-mentioned spring and means for raising and lowering said bolt.

5. In a firearm, a sliding block, a spring-actuated firing-pin carried thereby, a stop for limiting the movement of the latter and an ejector pivotally attached at its upper portion to said block and movable in unison therewith, in combination with a pair of arms and means for mechanically operating one of said arms, the other of said arms being operated by a portion of the force of the gases of explosion thereupon.

6. In a firearm, a sliding block, a firing-pin carried thereby, fingers pivoted to said firing-pin exteriorly of said block, the ends of said fingers normally abutting against said block, and a spring and a stop device for said firing-pin.

7. In a firearm, a sliding block, an ejecting device pivoted thereto, an opening in said device, a firing-pin mounted in said block, and having an offset portion or nose 48, said firing-pin passing through said opening, a spring for actuating said firing-pin and fingers attached to the latter, exteriorly of said block.

8. In a firearm, a sliding breech-block, an arm for actuating the same, a spring for restoring said breech-block, a locking-bolt moving transversely to said breech-block, means for actuating said locking-bolt, a firing-pin moving longitudinally of said breech-block and having a nose adapted to engage a stop, fingers mounted on said firing-pin exteriorly of said breech-block and an ejector pivotally attached to said block and movable in unison therewith.

9. In a firearm, a plurality of arms arranged at an angle to each other and rotatably supported, a restoring-spring for said arms, a chamber adapted to receive a cartridge and having a port leading therefrom, the extremity of one of said arms normally resting in proximity to said port, a rotatable hub on which said arms are mounted, a spring attached to said hub, a transversely-moving bolt adapted to be actuated by said last-mentioned spring, and means for mechanically operating said hub and arms from the exterior.

10. In a firearm, a sliding breech-block, having a chamber extending longitudinally thereof, a firing-pin mounted in said chamber, and movable therein, a spring for holding said firing-pin normally in inoperative position, fingers pivotally mounted on said firing-pin, exteriorly of said breech-block, said fingers being adapted to contact therewith and an extractor mounted on said breech-block and movable in unison therewith.

11. In a firearm, a sliding breech-block, a locking-bolt therefor, said bolt moving transversely to the direction of movement of said block, means for depressing said bolt, and for actuating said block, a firing-pin and shell-extractor having a toe portion 55× acting as an ejector, said extractor being carried by said block and means for returning the latter to its normal position, said extractor having an upper forwardly-extending claw and a lower forwardly-projecting toe portion.

12. In a firearm, a sliding breech-block, and a shell-extractor, pivotally attached thereto at its upper portion, said extractor having an upper forwardly-extending claw, which serves as a hook to engage a shell and a lower forwardly-projecting toe portion as an ejector.

13. In a firearm, a sliding hollow breech-block, a spring-actuated firing-pin movable therein, fingers pivotally mounted on said pin, exterior to said block, the extremities of said fingers being adapted to bear against said block when desired, for holding the firing-pin in cocked position.

14. In a firearm, a sliding block, a firing-pin and an extractor carried thereby, said extractor having an upper forwardly-extending claw and a lower forwardly-projecting toe portion adapted to act as an ejector and being also provided with an opening therein, through which said firing-pin is adapted to pass, a cartridge-chamber adjacent said extractor, and a rotatable magazine adapted to discharge into said chamber, said magazine being located out of alinement with the gun-barrel of said firearm.

15. In a firearm, the combination of a gun-barrel, a cartridge-chamber and a rotatable magazine, the latter being located out of alinement with said gun-barrel, in combination with a plate having an opening therein for the passage of the cartridge therethrough, and a lug thereon, said plate being interposed between said magazine and a contiguous plate projecting from the gun-stock, the latter plate having a recess therein for the reception of said lug.

16. A firearm having a sliding breech-block, a firing-pin carried thereby, a spring actuating said firing-pin, a stop limiting the movement of the latter, a hub carrying projecting arms and means for mechanically operating one of said arms, the other of said arms being operated by a portion of the force of the gases of explosion thereon.

ANTONIO TRAVAGLINI.

Witnesses:
E. S. COURSIN,
JOHN BROADY.